US010599326B2

(12) United States Patent
Xu

(10) Patent No.: US 10,599,326 B2
(45) Date of Patent: Mar. 24, 2020

(54) EYE MOTION AND TOUCHSCREEN GESTURES

(71) Applicant: HEWLETT-PACKARD DEVELOPMENT COMPANY, L.P., Houston, TX (US)

(72) Inventor: Rui Xu, Shanghai (CN)

(73) Assignee: Hewlett-Packard Development Company, L.P., Spring, TX (US)

(*) Notice: Subject to any disclaimer, the term of this patent is extended or adjusted under 35 U.S.C. 154(b) by 231 days.

(21) Appl. No.: 15/309,817

(22) PCT Filed: Aug. 29, 2014

(86) PCT No.: PCT/CN2014/085488
§ 371 (c)(1),
(2) Date: Nov. 9, 2016

(87) PCT Pub. No.: WO2016/029422
PCT Pub. Date: Mar. 3, 2016

(65) Prior Publication Data
US 2017/0262168 A1 Sep. 14, 2017

(51) Int. Cl.
G06F 3/048 (2013.01)
G06F 3/0488 (2013.01)
(Continued)

(52) U.S. Cl.
CPC .......... G06F 3/04883 (2013.01); G06F 3/013 (2013.01); G06F 3/038 (2013.01); G06F 3/04845 (2013.01); G06F 2203/0381 (2013.01); G06F 2203/04806 (2013.01); G06F 2203/04808 (2013.01)

(58) Field of Classification Search
CPC ............................ G06F 3/013; G06F 3/04845
See application file for complete search history.

(56) References Cited

U.S. PATENT DOCUMENTS 7,561,143 B1 * 7/2009 Milekic .................. G06F 3/013
345/156
2013/0135196 A1 5/2013 Park et al.
(Continued)

FOREIGN PATENT DOCUMENTS

CN 103383596 A 11/2013
CN 103605422 A 2/2014
(Continued)

OTHER PUBLICATIONS

Emiliano Miluzzo et al., "Eyephone: Activating Mobile Phones with Your Eyes," MobiHeld 2010, New Delhi, India, Aug. 30, 2010, pp. 1-6, ACM.

Primary Examiner — Mohamed Abou El Seoud
(74) Attorney, Agent, or Firm — HPI Patent Department

(57) ABSTRACT

In an example implementation, a method of providing multi-gesture input on a touchscreen device includes sensing a finger gesture at a touchscreen initiation area. In response to sensing the finger gesture, images of a user's eye are captured and an eye-tracking function is initiated to determine eye motion and an end gaze point of the user's eye from the images. The method includes sensing a release of the finger gesture and activating a device function associated with the end gaze point of the user's eye.

13 Claims, 7 Drawing Sheets

(51) Int. Cl.
    *G06F 3/01*         (2006.01)
    *G06F 3/0484*    (2013.01)
    *G06F 3/038*     (2013.01)

(56) References Cited

U.S. PATENT DOCUMENTS

| | | | |
|---|---|---|---|
| 2013/0145304 A1 | 6/2013 | DeLuca et al. | |
| 2013/0169532 A1* | 7/2013 | Jahnke | G06F 3/013 345/158 |
| 2013/0169560 A1 | 7/2013 | Cederlund et al. | |
| 2013/0293488 A1* | 11/2013 | Na | G06F 3/013 345/173 |
| 2013/0335358 A1* | 12/2013 | Bowens | G06F 3/03547 345/173 |
| 2014/0111452 A1 | 4/2014 | Park et al. | |
| 2015/0077357 A1* | 3/2015 | Han | G06F 3/013 345/173 |
| 2015/0145777 A1* | 5/2015 | He | G06K 9/0061 345/158 |

FOREIGN PATENT DOCUMENTS

| | | | | |
|---|---|---|---|---|
| JP | 2003-256128 A | | 9/2003 | |
| KR | 2015-0025041 A | * | 8/2013 | G06F 3/03 |

\* cited by examiner

EYE MOTION AND TOUCHSCREEN GESTURES

BACKGROUND

With the proliferation of mobile devices such as smartphones and tablets, users have become accustomed to entirely new ways of interacting with computers. The touchscreen (i.e., touch-sensitive display screen), for example, is a ubiquitous feature in mobile devices that enables users to interact directly with what is displayed on the screen without having to use intermediate devices such as a mouse, touchpad, or keyboard. Touchscreens are also common in devices such as game consoles, personal computers computer and network terminals, and various home office, and industrial appliances. In general, touchscreens have become integral components in many devices where user interfaces such as keyboards or a mouse are unsuitable or unable to provide quick, accurate, and intuitive interaction with content on the display screen.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
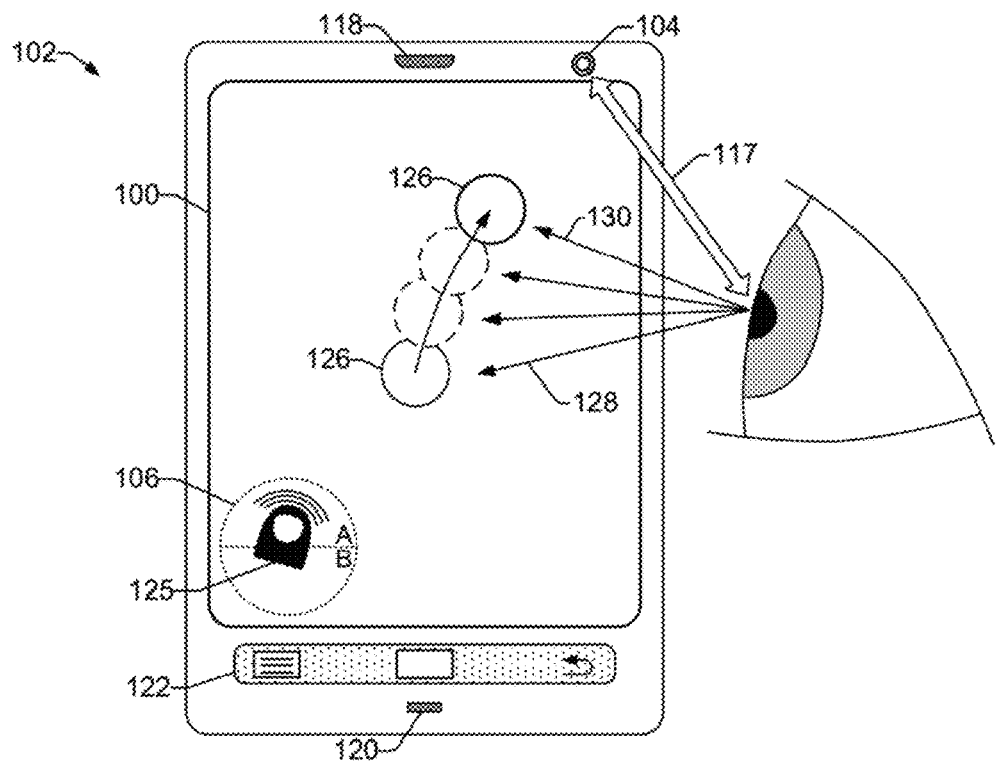
FIGS. 1, 2, and 3, show an example of a multi-gesture input to a user interface touchscreen of a touchscreen device.

As noted above, touchscreen have become integral to many devices such as mobile and other computing devices, terminals, appliances for home, office, and industrial applications, and so on. Touchscreens provide users with direct, accurate, and intuitive access to items being displayed on the screen, without the use of cumbersome peripheral interfaces such as keyboards or a mouse. Interacting with a device through its touchscreen generally involves initiating one or multiple points of contact with the touchscreen using a finger, multiple fingers, or a pen/stylus. Performing different finger gestures (i.e., motions made with fingers while contacting the touchscreen) enables users to access, initiate, and/or manipulate content displayed on the screen. Content can include various objects such as menu items, application icons, virtual buttons, numbers, images, text, and so on.

There are numerous gestures available for interacting with touchscreen devices. Such gestures can be categorized generally as either static gestures or dynamic/manipulation gestures. Static gestures are typically single-touch gestures that involve the use of a single finger, while dynamic gestures are usually more complex, multi-touch gestures that involve the use of more than one finger at the same time. For example, tapping the touchscreen can be considered to be a static gesture, as it involves a single finger touching the screen and then lifting up from the screen. Pressing and holding can also be considered to be a static gesture as it involves a single finger touching the screen and staying in place on the screen. One example use case for a static gesture may be dialing a telephone number on a smartphone, which can involve tapping a telephone icon on the screen to bring up a virtual telephone number pad, and then tapping the screen in different locations to select appropriate numbers from the virtual number pad. Another example use case may be initiating a particular application on a tablet computer by tapping or double tapping an appropriate application icon displayed on the screen.

Examples of dynamic or manipulation gestures include sliding, swiping, rotating, pinching, and expanding, which mostly comprise multi-touch gestures that involve the use of more than one finger. Sliding involves one or more fingers touching the screen and moving in the same direction, so as to move content across the screen, for example. Swiping involves one or more fingers touching the screen and moving a short distance in the same direction on the screen. Swiping can be a finger "flicking" gesture that enables functions such as turning the pages of a virtual book or moving from one screen to the next to view content displayed on different screens of a device. Rotating involves two or more fingers touching the screen and moving in a clockwise or counterclockwise direction to rotate content on the screen such as images or other objects. Pinching is a shrinking gesture that involves two or more fingers touching the screen and moving closer together to reduce the size of content displayed on the screen such as images or other objects. Expanding is an enlarging gesture that involves two or more fingers touching the screen and moving farther apart to increase the size of content displayed on the screen such as images or other objects.

There can be numerous other examples of static and dynamic finger gestures that enable user interaction with touchscreen devices. While these types of finger gestures are generally useful for providing quick, accurate, and intuitive interaction with touchscreen devices, they can also be limiting in certain scenarios where a user has only one hand available for interacting with a mobile touchscreen device, such as a tablet or smartphone. This is increasingly true as mobile device designs transition to larger and larger touchscreen displays. With smaller touchscreen displays, users may be able to use one hand to hold the device while performing certain static, single-touch gestures, to interact with the touchscreen using a single finger or thumb on the same hand that is holding the device. However, as the sizes of touchscreen displays on many devices continue to increase, holding a device and interacting with the device using a single hand becomes impractical. Holding the device in one hand while attempting to stretch a single finger or thumb from the same hand across the touchscreen to perform finger gestures is typically not possible.

Furthermore, performing dynamic, multi-touch gestures with one hand is even more impractical. That is, holding a touchscreen device with one hand and performing dynamic, multi-touch gestures with multiple fingers from the same hand is generally not possible. Instead, performing such multi-touch gestures involves the use of two hands, where one hand is used to hold the device while fingers on the other hand are free to perform the multi-touch gestures. In some scenarios, a user can put a device down on a secure surface to immobilize the device and facilitate single-handed performance of such multi-touch gestures, but this approach generally defeats the purpose of device mobility.

Accordingly, example methods and, devices disclosed herein enable single-handed performance of both static, single-touch gestures, and dynamic, multi-touch gestures to enable user interaction with touchscreen display devices. Multi-touch gestures are implemented through different static and dynamic gestures performed by a single digit (e.g., a user's thumb), in combination with vision gestures determined by an eye-tracking function. Touchscreen devices can use a front-facing camera or other optical sensor to capture images and/or other eye-reflection information from a user's eye. Position information for the user's eye balls, nose, and mouth can also be captured to determine the distance and angle between the user's face and the camera. The eye-tracking function can use this imaging information to determine the motion of the user's eye and the location of the user's gaze (i.e., the point on the screen where the user is looking). The eye motion and eye gaze point can be used as a virtual finger that provides vision gestures that can be construed in the same or similar manner as finger gestures entered through direct finger contact with the touchscreen. The combination of the user's vision gestures with actual finger gestures provided by a single finger from a single hand of the user can be interpreted as multi-touch gestures to control user interactions with the touchscreen device, such as sliding, swiping, rotating, pinching, and expanding, which as noted above, are gestures typically performed by two hands with the use of multiple fingers.

In one example, a method of providing multi-gesture input on a touchscreen device includes sensing a press-and-hold finger gesture at a touchscreen initiation area. In response to sensing the finger gesture, images of a user's eye are captured and an eye-tracking function is initiated to determine an eye motion and an end gaze point of the user's eye from the images. A release of the press-and-hold finger gesture is sensed, and a device function that is associated with the end gaze point of the user's eye is activated.

In another example, a touchscreen device includes a touchscreen to display objects and to sense a finger gesture. The device includes a camera to capture images of a user's eye, and an eye-tracking module to determine an eye gesture based on the captured images. A multi-gesture control module initiates a function of the touchscreen device based on a combination of the finger gesture and the eye gesture.

In another example, a non-transitory machine-readable storage medium stores instructions that when executed by a processor of a touchscreen device, cause the touchscreen device to sense a finger contact and a finger motion direction within an initiation area of a touchscreen. The instructions further cause the touchscreen device to initiate an eye-tracking function to determine an eye motion direction of a user's eye, and to manipulate an object displayed on the touchscreen based on a combination of the finger motion direction and the eye motion direction.

FIGS. 1-6 show examples of user interface touchscreens 100 implemented on a touchscreen device 102. The touchscreen device 102 is generally intended to represent any of a variety of computing devices that may incorporate a user interface touchscreen 102, such as smartphones, tablets, game consoles, personal digital assistants (PDAs), portable multimedia players, audio players, laptop computers, personal computers, workstations, retail point of sale devices, wearable computing devices, smart televisions, scientific instruments, and so on. In some examples, touchscreen device 102 can also represent other types of devices that incorporate touchscreens 100 either directly or peripherally, including computers and networks implementing touchscreen terminals, automated teller machines (ATMs), kiosks, and various home, office, and industrial appliances.

A touchscreen 100 comprises a touch sensitive electronic visual display that can sense and respond to single and multi-touch gestures. Such gestures comprise finger gestures and other input resulting from direct contact with the touchscreen 100 from a user through the use of one or more fingers, or through a special stylus/pen. Thus, content displayed on the touchscreen, such as images, text, icons, and other objects, can be controlled and manipulated without the use of additional peripheral interface devices such as a keyboard, a mouse, or a touchpad.

As shown in the examples of FIGS. 1-6, a touchscreen device 102 additionally comprises an integrated camera unit 104. The camera 104 can include any type of imaging device capable of capturing eye images or other eye-reflected information that enables an eye tracking function. For example, camera 104 can include an infrared-light-emitting micro-projector to emit infrared light, that when reflected from the eye can be sensed by the camera. In general, a camera 104 can be capable of receiving and processing various reflective information from different parts of the eye including reflections from the cornea, the eye lens, the pupil, retinal blood vessels, and son on.

Thus, the camera unit 104 can capture images and/or other reflective information from the user's eye that enable the touchscreen device 102 to track a user's eye motion and determine locations of a user's gaze upon the touchscreen (i.e., gaze points). Using such imaging information from the camera 104, the touchscreen device 102 can effectively transform the user's eye into a virtual finger capable of providing user input in a manner similar to a user's finger, by interpreting the user's eye motions and eye gaze points as visual gestures. Thus, prior multi-touch gestures that involved the use of multiple fingers to perform a variety of functions for controlling and manipulating touchscreen content, can now be achieved as multi-gesture inputs that incorporate a finger touch gesture and an eye visual gesture. Accordingly, in the described examples, a multi-gesture input can comprise a combination of a finger gesture from a single finger (or thumb) and a visual gesture from a user's eye. A touchscreen device 102 generally includes an internal controller and various other components to enable the performance of such functions, including the control of an eye tracking function and the determination of multi-touch gestures from a combination of finger and visual gestures. Such a controller and components of a touchscreen device 102 are discussed below with regard to FIG. 7.

Also shown in FIGS. 1-6, a touchscreen 100 additionally comprises a touchscreen initiation area 106. Typically, the touchscreen initiation area 106 is in a location on the screen 100 that enables a user to both hold the touchscreen device 102 with one hand (e.g. the left hand) while also initiating device functions using a single digit. In a likely use case, the touchscreen initiation area 106 can be located in the lower left-hand corner of the screen 100 to enable a user to hold the touchscreen device 102 in the left hand while using the left thumb to perform single finger gestures in and around the touchscreen initiation area 106. The touchscreen initiation area 106 is typically configured into at least two sub-areas (e.g., A and B) that enable the initiation of different functions related to content displayed on the screen 100. In general, however, the touchscreen initiation area 106 in not limited to the examples described herein, but is instead an arbitrary area of the screen 100 whose size, location, and configuration, are all programmable by a user. Thus, in some examples, the size, location, and configuration of the touchscreen area 106 may vary.

Figure 7:
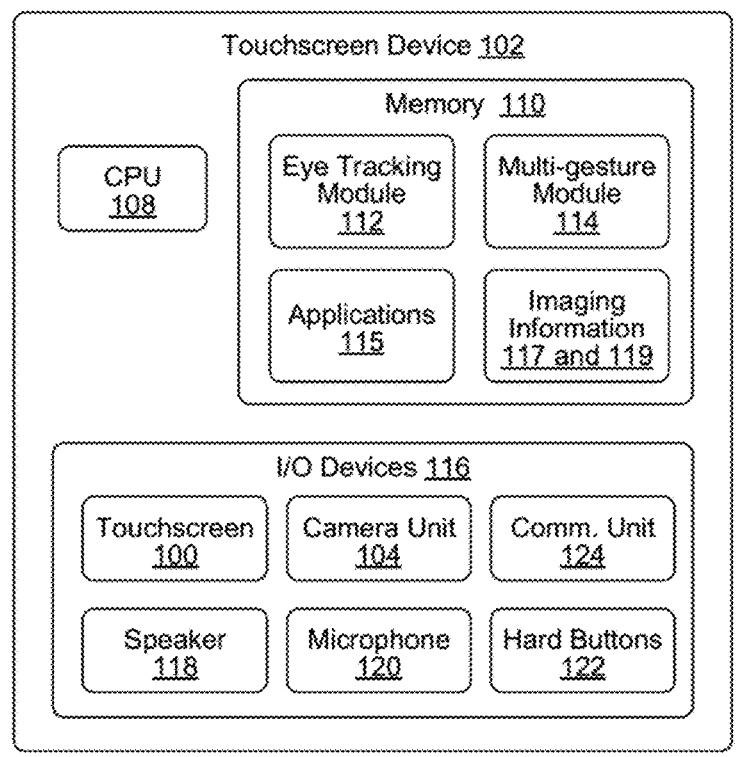
FIG. 7 shows a schematic block diagram of an example of a touchscreen device suitable for controlling device functions using combinations of finger gestures determined from direct contact with the touchscreen, and visual gestures determined from tracking the motion and gaze of a user's eye.

FIG. 7 shows a schematic block diagram of a touchscreen device 102 suitable for controlling device functions using combinations of finger gestures determined from direct contact with the touchscreen, and visual gestures determined from tracking the motion and gaze of a user's eye. Examples of touchscreen devices 102 generally incorporate components of a typical computing device, such as a controller that can be implemented as one or more processors (CPU) 108 and a memory 110. Memory 110 can include both volatile (i.e., RAM) and nonvolatile memory components (e.g., ROM, hard disk, optical disc, CD-ROM, magnetic tape, flash memory, etc.). The components of memory 110 comprise non-transitory, machine-readable (e.g., computer/processor-readable) media that provide for the storage of machine-readable coded program instructions, data structures, program instruction modules, applications, and other data/information for the touchscreen device 102, such as eye tracking module 112, multi-gesture input module 114, applications 115, and imaging information 117.

The program instructions, applications, data structures, and modules stored in memory 110 may be part of an installation package that can be executed by processors 108 to implement various examples, such as examples discussed herein. Thus, memory 110 may be a portable medium such as a CD, DVD, or flash drive, or a memory maintained by a server from which the installation package can be downloaded and installed. In another example, the program instructions, applications, data structures, and modules stored in memory 110 may be part of an application or applications already installed, in which case memory 110 may include integrated memory such as a hard drive.

A touchscreen device 102 also typically includes venous input/output (I/O) devices 116. In different examples, such I/O devices 116 can vary, but in the examples described herein they include at least a touchscreen display 100 and camera unit 104. I/O devices 116 also typically include a speaker 118, a microphone 120, and one or more hard buttons 122 for implementing specific device functions such as powering the device on and off, controlling the speaker volume, returning the device to a home screen, and so on. In some examples, such as with a mobile smartphone, the touchscreen device 102 can include a communication unit 124 to support mobile and other short and/or long range communication. A communication unit 124 generally enables the transmission and receipt of signals such as voice, video, and other date over a radio frequency channel using any of a variety of different wireless radio communication protocols.

As noted above, the touchscreen device 102 may implement various application programs 115 (i.e., by execution on a processor 108). Such applications 115 can vary widely in the functionality they provide for a user, and can include functions such as web browsing, telephone calling, image editing, word processing, spreadsheets, media playback, and so on. In some examples, such applications 115 are accessible to a user through icons or other objects (not shown) displayed on the touchscreen 100. The eye tracking module 112 and multi-gesture input module 114 execute to enable a user to initiate and control such applications, as well as to enable the user to manipulate various objects on the touchscreen that may be associated with such applications.

The camera unit 104 noted above can capture images and other reflective information 117 from the user's eye to enable the eye tracking module 112 to track a user's eye motion and gaze points of the user's eye on the touchscreen 100. Other information 119 (see FIG. 2 also) can also be captured such as position information 119 for the user's eye balls, mouth, and nose position with respect to the camera. This imaging information 117 and 119 can be used to calculate the distance and angle between the user's face and camera using biometrics data stored in memory. Position information 119 for the user's eye balls, mouth, and nose make gaze point estimations more accurate, especially when the user is moving (e.g., operating the device while walking). When position information 119 cannot be acquired by camera, the eye tracking module 112 can still acquire the gaze point using imaging information 117. By contrast to finger gestures entered through direct physical contact with the touchscreen 100, the eye tracking function implemented by module 112 provides a non-contact, optical method for measuring eye motion and eye gaze points that can be translated into visual gestures from the user. The multi-gesture input module 114 can interpret the user's finger and visual gestures as a multi-gesture input to control various content on the display screen, including objection manipulation, data entry (e.g., dialing a phone number), application initiation, and so on. In some examples, the camera 104 can capture imaging information such as images or sensed light (e.g., infrared light) reflected from different part of the user's eye (e.g., the cornea, eye lens, pupil, retinal blood vessels). The eye tracking module 112 can analyze the imaging information 117 and 119, and determine the motion and point of gaze of the eye, for example, based on changes in the reflected light from the user's eye and position information of the user's eye balls, mouth, and nose.

Figure 2:
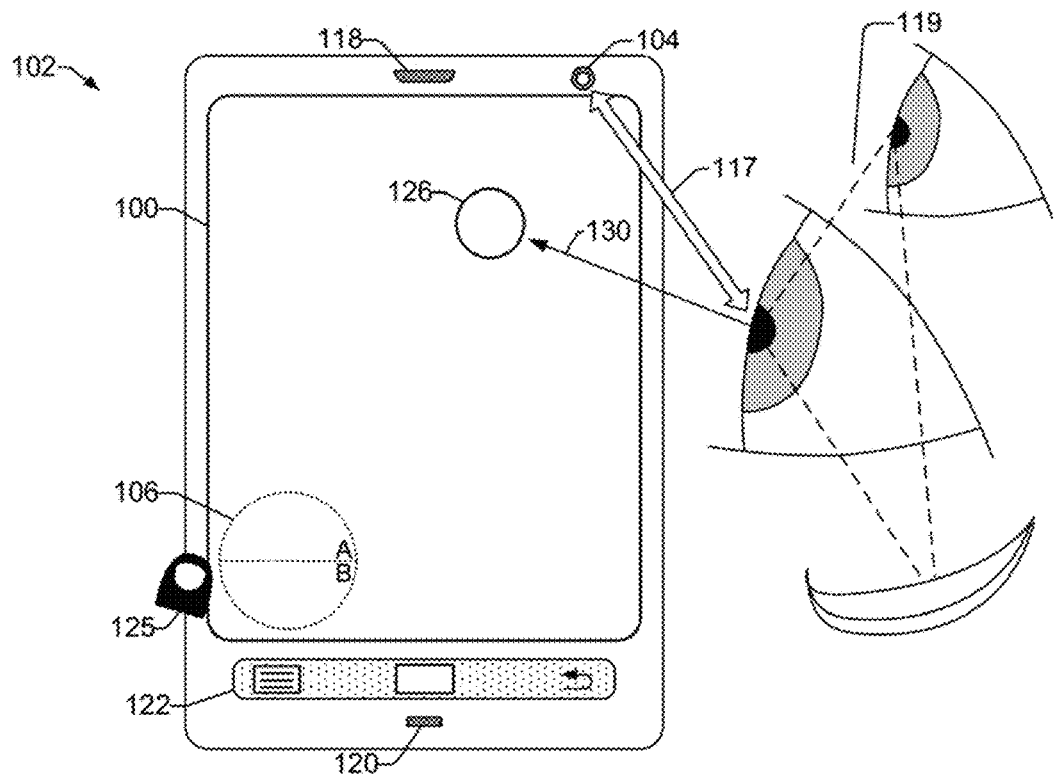
Figure 3:
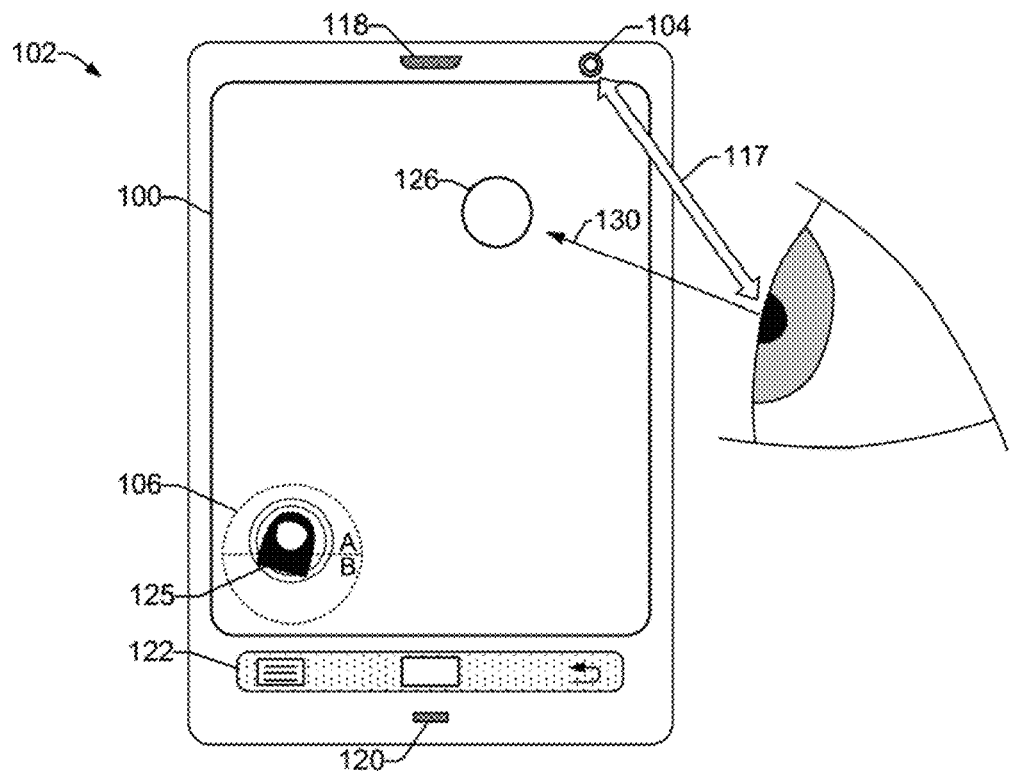

Referring now to FIGS. 1, 2, and 3, an example of a multi-gesture input to a user interface touchscreen 100 of a touchscreen device 102 is shown. In FIG. 1, a user makes a press-and-hold gesture in a sub-area "A" of the initiation area 106 on touchscreen 100 with a single digit, such as a thumb 125. In this example, the multi-gesture input module 114 is configured to interpret the press-and-hold gesture in a sub-area "A" as an instruction to initiate execution of the eye tracking module 112, and to activate the camera 104 so it begins capturing imaging information 117 from the user's eye. Based on the press-and-hold gesture in a sub-area "A" the multi-gesture input module 114 can initiate the eye tracking module 112 in a particular mode, such as a marker mode. In a marker mode, the eye tracking module 112 executes to place an eye assistant marker 126 on the touchscreen 100. The assistant marker 126 marks a location on the screen that assists a user in focusing eye gaze at a beginning gaze point 128. In some examples, the assistant marker 126 is transparent, to enable the user to see an object on the screen underneath the marker 126.

Once the assistant marker 126 appears on the touchscreen 100, the eye tracking module 112 tracks the motion of the user's eye using imaging information 117 and 119 from camera 104, and identifies changes in the direction and location of the user's gaze. The eye tracking module 112 adjusts the position of the assistant marker 126 on the screen so that the marker tracks or follows the user's eye motion to a stationary location on the screen which is an end gaze point 130 of the eye on the screen. Thus, the user effectively moves the assistant marker 126 to a desired location on the screen through the motion of the user's eye. When the user's eye motion has substantially stopped, and the user's gaze is focused at the end gaze point 130, the user can lift the single digit 125 and release the press-and-hold gesture, as shown in FIG. 2. Release of the press-and-hold gesture provides an indication to the multi-gesture input module 114 that the repositioned assistant marker 126 is at the user's end gaze point 130, and that whatever object is displayed on the screen at the location of the repositioned assistant marker 126 (i.e., the user's end gaze point 130) is the object that the user wants to activate, initiate, manipulate, or otherwise control.

In one example, as shown in FIG. 2, the mere lifting of the press-and-hold gesture by the single digit 125 can activate, initiate, manipulate, or control the object displayed on the screen at the location of the repositioned assistant marker 126, or user's end gaze point 130. In other examples, as shown in FIG. 3, the user can provide an additional finger gesture such as a single tap or double tap of the digit 125, within the initiation area 106 on touchscreen 100 to activate, initiate, manipulate, or control the object displayed on the screen at the location of the repositioned assistant marker 126, or user's end gaze point 130.

Figure 4:
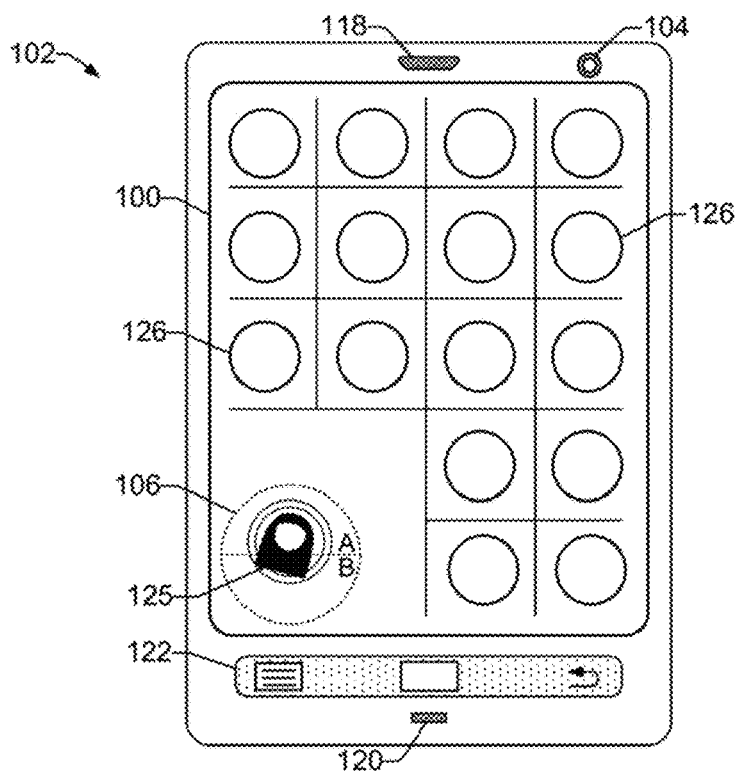
FIG. 4 shows an example of an eye assistant marker that can be moved through tracking eye motion to any location on a touchscreen.

As shown in FIG. 4, the assistant marker 126 can be moved through tracking eye motion to any location on the touchscreen 100 as a way to assist the user in selecting an object on the screen to manipulate or activate. It is natural for a user's eye to first gaze on the assistant marker 126 at its beginning position, and then to move to a desired location on the screen. The eye tracking module 112 moves the marker 126 to follow the user's eye movement direction. If the user's eye movement is too fast for the eye tracking module 112 to keep up, the user's natural gaze back at the marker 126 will enable the module 112 to continue tracking the eye movement with the assistant marker 126. In the event that the user's eye movement is not continuous in one direction, but instead moves back and forth, eye tracking module 112 will recognize that the marker 126 is moving slower (or faster) compared to user's eye movement and make an adjustment to the marker's speed to match it with the users eye movement for subsequent eye tracking. These adjustments make it so the user does have to run a calibration process (e.g., gazing at specific points for each interaction before making gestures or after the camera position changes) each time before interactions with the device. Module 112 will calibrate itself adaptively when moving the marker 126 according to eye movement. In one example, if the user moves his eye gaze off of the touchscreen 100 without deactivating the eye tracking, the marker 126 will stay at edge of the touchscreen 100 and wait for the user's gaze to move back onto the screen.

Figure 5:
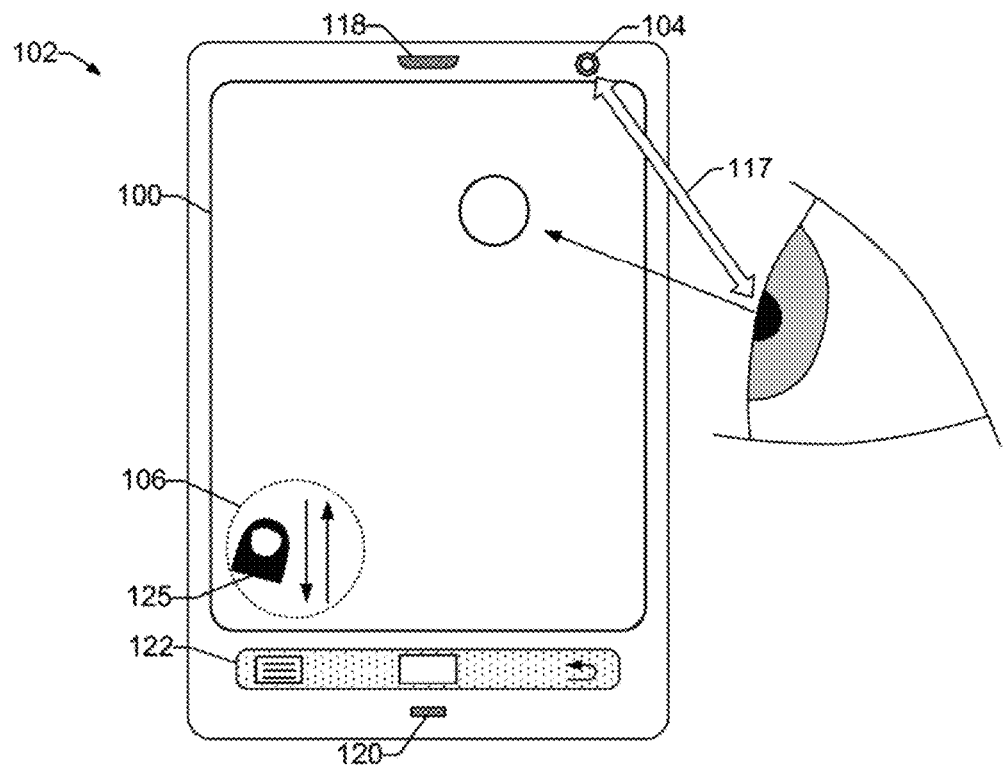
FIG. 5 shows another example of a multi-gesture input to a interface touchscreen of a touchscreen device.

Referring to FIGS. 1 and 5, another example of a multi-gesture input to a user interface touchscreen 100 of a touchscreen device 102 is shown. The example begins as shown in FIG. 1 and as previously discussed, with a user making a press-and-hold gesture in a sub-area "A" of the initiation area 106 on touchscreen 100 with a single digit 125, and then moving the assistant marker 126 to a desired location on the screen through the motion of the users eye. As shown in FIG. 5, when the users eye motion has substantially stopped, and the user's gaze is focused at the end gaze point 130, the user can scroll within an object located on the screen at the location of the repositioned marker 126, or end gaze point 130. Scrolling up and down at the end gaze point 130 is achieved as shown in FIG. 5 using a single digit 25 performing swiping motions in up and down directions against the touchscreen 100.

Figure 6A:
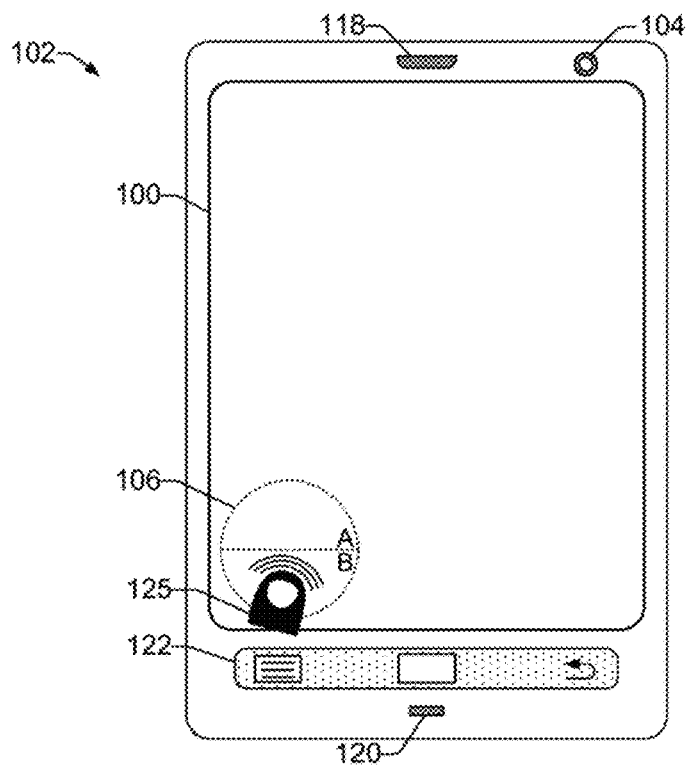
FIGS. 6a, 6b, 6c, and 6d, show additional examples of multi-gesture inputs to a user interface touchscreen of a touchscreen device.
Figure 6B:
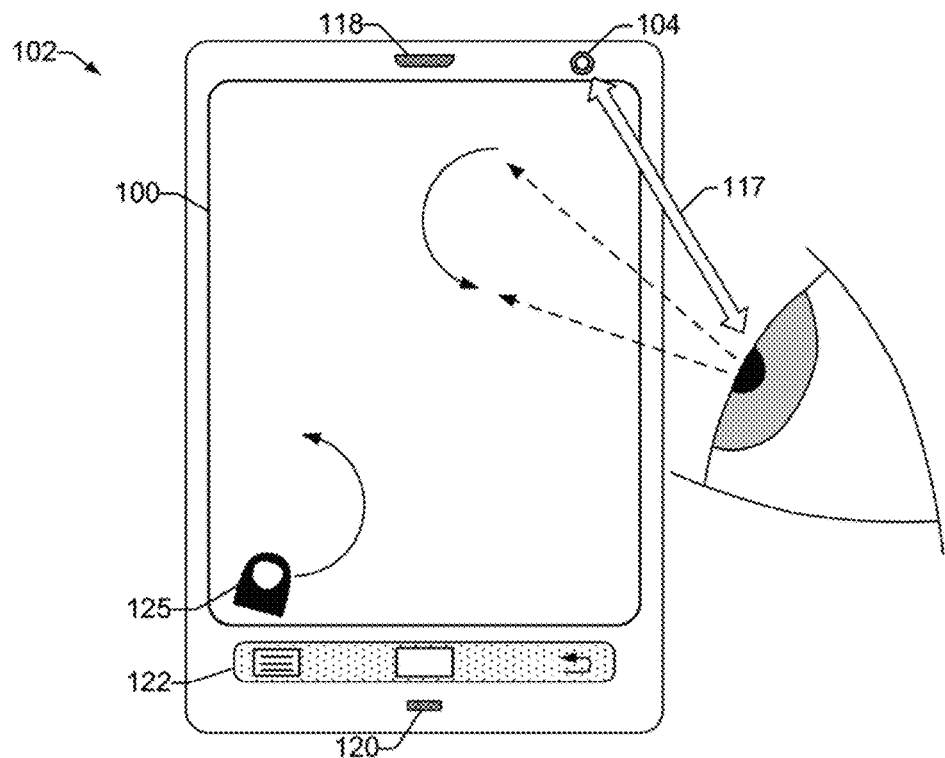

Referring now to FIGS. 6a, 6b, 6c, and 6d, additional examples of multi-gesture inputs to a user interface touchscreen 100 of a touchscreen device 102 are shown. The functions performed by the multi-gesture inputs of FIGS. 6a, 6b, 6c, and 6d, are related to the manipulation of an object displayed on the touchscreen 100, such as an image or text. In these examples, as shown in FIG. 6a, the user makes a press-and-hold gesture in a different sub-area "B" of the initiation area 106 on touchscreen 100 with a single digit 125. As noted above, the touchscreen initiation area 106 can be configured into multiple sub-areas (e.g., A and B) that enable the initiation of different functions related to content displayed on the screen 100. As shown in FIG. 6b, after the press-and-hold gesture is applied in sub-area "B" of the initiation area 106 on touchscreen 100, the user can manipulate an object displayed on the screen by providing a finger gesture and a visual gesture. The finger gesture can be a rotating motion in a counterclockwise 600 direction and the visual gesture can also be a rotating motion of the eye in a counterclockwise 602 direction. The eye tracking module 112 can track the eye movement to determine the counterclockwise motion of the eye, and the multi-gesture input module 114 can interpret the finger and eye gestures as a multi-gesture input to rotate the displayed object in a counterclockwise direction on the screen 100. In other examples, the rotating motions of the finger gesture and visual gesture can be in a clockwise direction to rotate the displayed object in a clockwise direction.

Figure 6C:
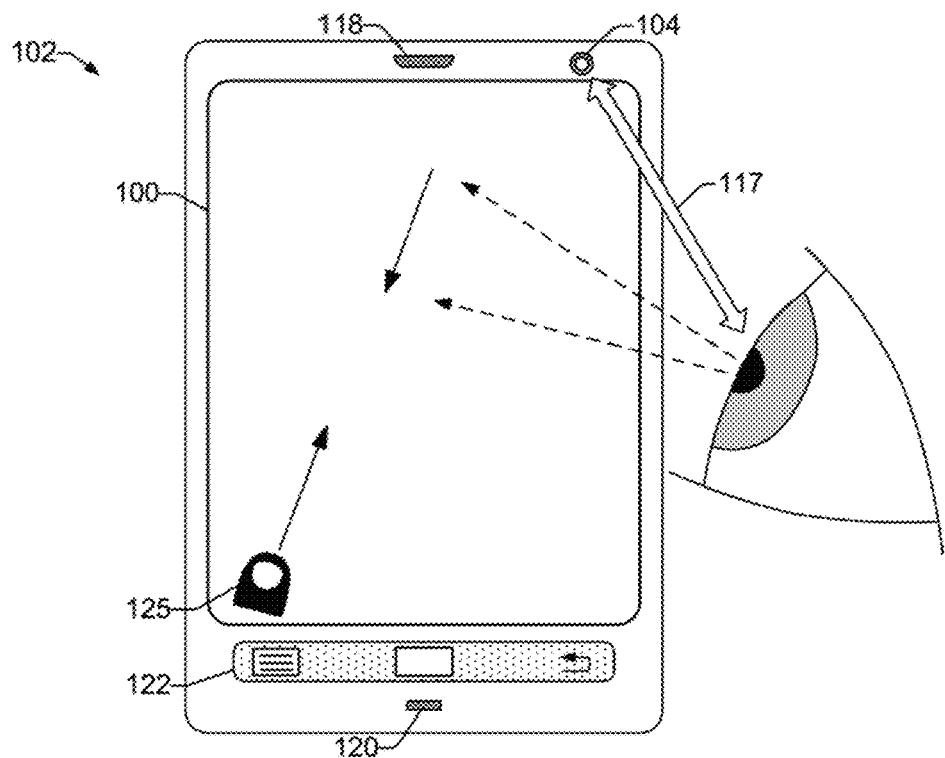
Figure 6D:
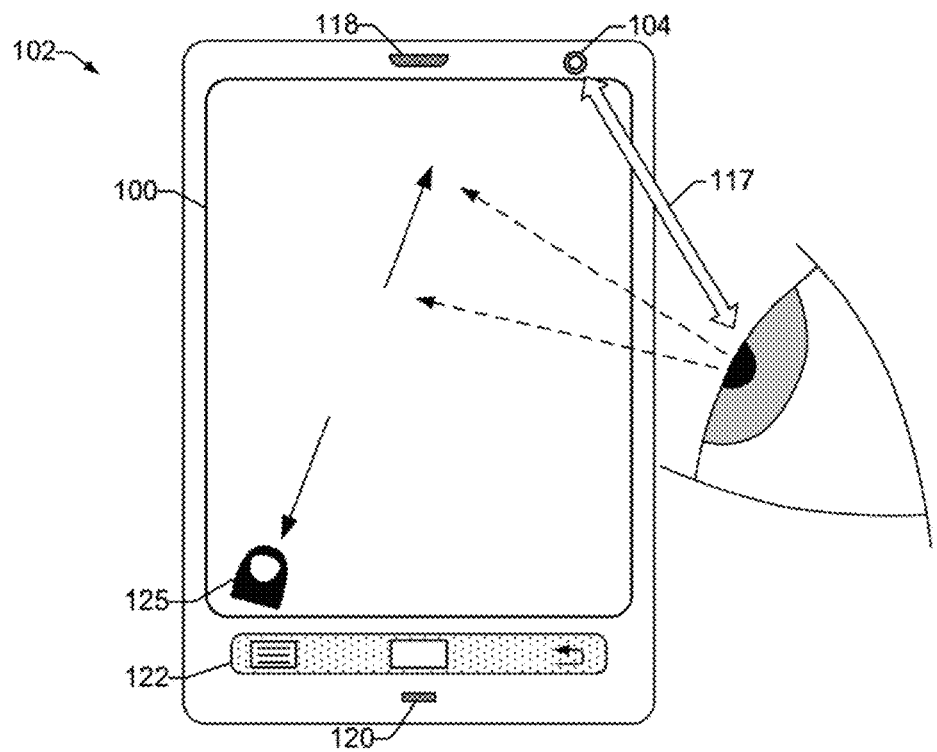

As shown in FIGS. 6c and 6d, after the press-and-hold gesture is applied in sub-area "B" of the initiation area 106 on touchscreen 100, the user can manipulate an object displayed on the screen by providing different finger gestures and visual gestures. More specifically, as shown in FIG. 6c, the finger gesture can be a swiping motion directed inward toward the interior of the screen 100 and toward the direction of the motion of the eye, while the visual gesture can be an eye motion toward the interior of the screen 100 and toward the finger motion direction. The multi-gesture input module 114 can interpret these gestures together as a pinching gesture that shrinks the size of the object being displayed on the screen 100. As shown in FIG. 6d, the finger gesture can be a swiping motion directed outward toward the exterior of the screen 100 and away from the direction of the motion of the eye, while the visual gesture can be an eye motion toward the exterior of the screen 100 and away from the finger motion direction. The multi-gesture input module 114 can interpret these gestures together as an enlarging gesture that increases the size of the object being displayed on the screen 100.

Figure 8:
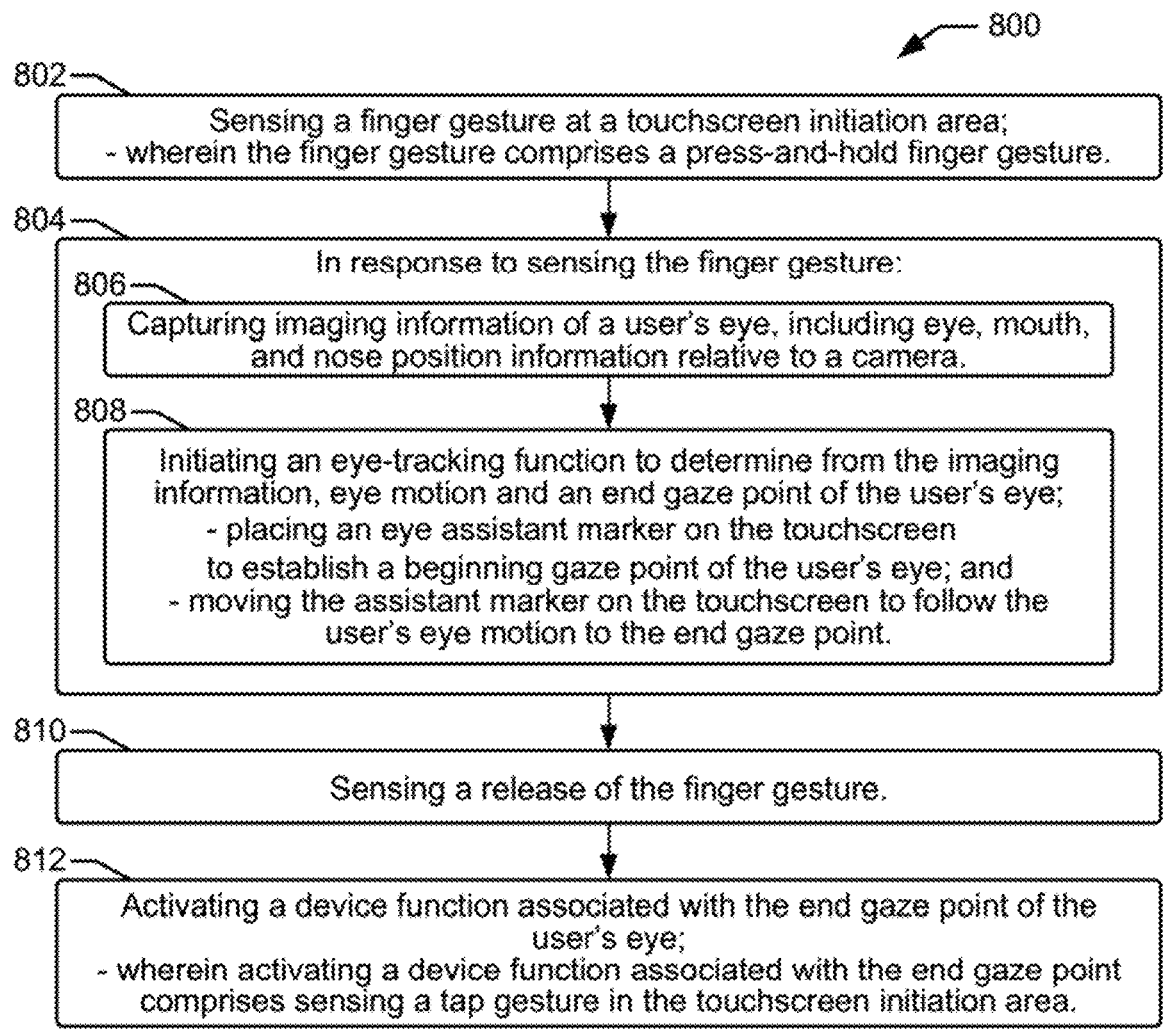
FIGS. 8 and 9 show flow diagrams of example methods related to providing multi-gesture inputs on a touchscreen device where the gestures include both finger gestures and visual gestures.
Figure 9:
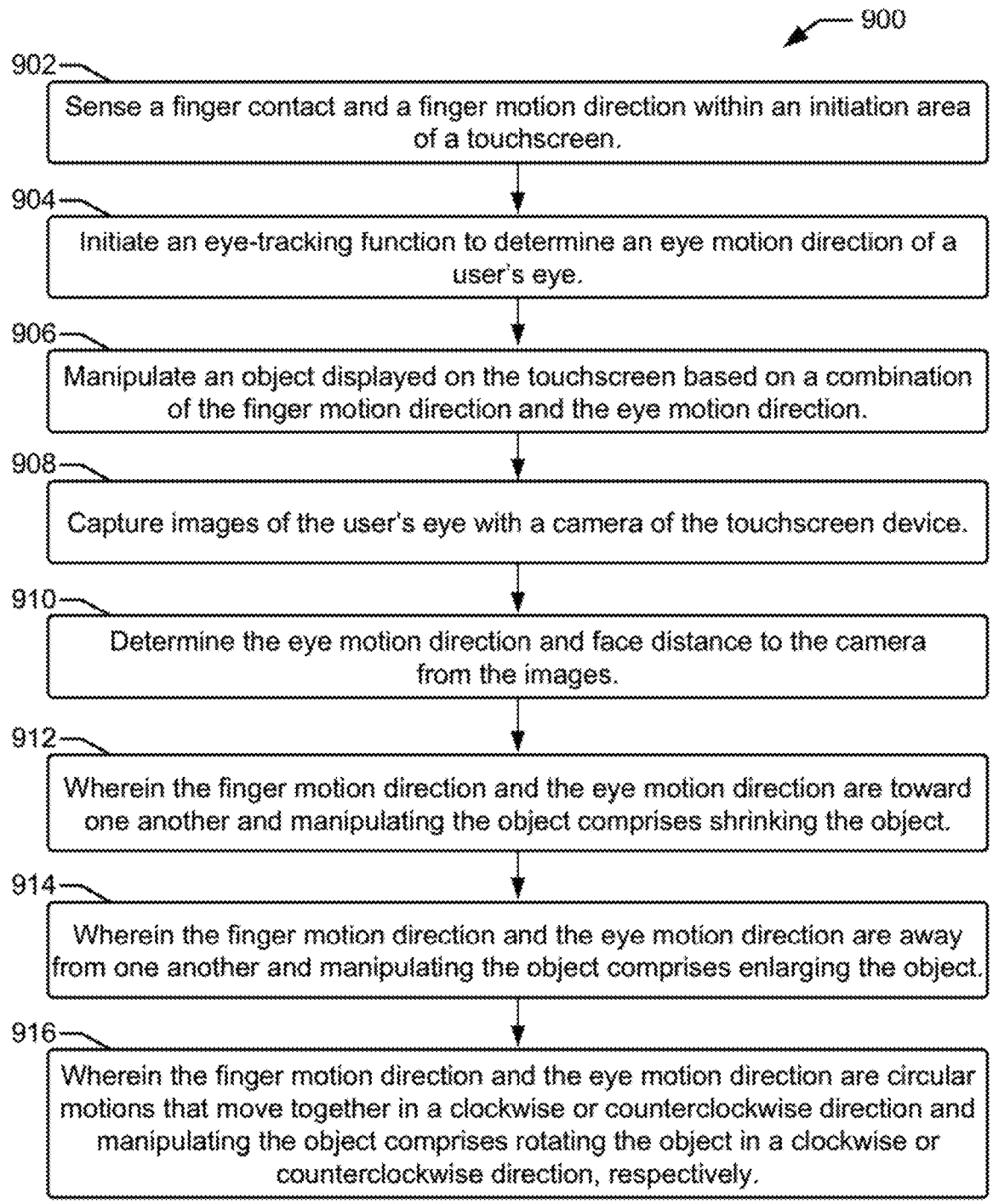

FIGS. 8 and 9 show flow diagrams that illustrate example methods 800 and 900, related to providing multi-gesture inputs on a touchscreen device where the gestures include both finger gestures and visual gestures. Methods 800 and 900 are associated with the examples discussed above with regard to FIGS. 1-7, and details of the operations shown in methods 800 and 900 can be found in the related discussion of such examples. The operations of methods 800 and 900 may be embodied as programming instructions stored on a non-transitory, machine-readable (e.g., computer/processor-readable) medium, such as memory 110 of a touchscreen device 102 as shown in FIG. 7. In some examples, implementing the operations of methods 800 and 900 can be achieved by a processor, such as a processor 108 of FIG. 7, reading and executing the programming instructions stored in a memory 110. In some examples, implementing the operations of methods 800 and 900 can be achieved using an ASIC (application specific integrated circuit) and/or other hardware components alone or in combination with programming instructions executable by processor 108.

Methods 800 and 900 may include more than one implementation, and different implementations of methods 800 and 900 may not employ every operation presented in the respective flow diagrams. Therefore, while the operations of methods 800 and 900 are presented in a particular order within the flow diagrams, the order of their presentation is not intended to be a limitation as to the order in which the operations may actually be implemented or as to whether all of the operations may be implemented. For example, one implementation of method 800 might be achieved through the performance of a number of initial operations, without performing one or more subsequent operations, while another implementation of method 800 might be achieved through the performance of all of the operations.

Referring now to the flow diagram of FIG. 8 an example method 800 of providing multi-gesture inputs on a touchscreen device where the gestures include both finger gestures and visual gestures, includes sensing a finger gesture at a touchscreen initiation area, as shown at block 802. In some examples, the finger gesture comprises a press-and-hold finger gesture. As shown at block 804, in response to sensing the finger gesture, imaging information from a user's eye is captured (block 806). Also in response to sensing the finger gesture, an eye-tracking function is initiated to determine from the imaging information, eye motion and an end gaze point of the user's eye, as shown at block 808. In some examples initiating the eye-tracking function includes placing an eye assistant marker on the touchscreen to establish a beginning gaze point of the user's eye, and then moving the assistant marker on the touchscreen to follow the user's eye motion to the end gaze point. Moving the assistant marker on the touchscreen can include receiving an image indicating the user's eye motion has shifted the user's eye away from the beginning gaze point and to a new gaze point, followed by moving the assistant marker to the new gaze point. The method can include continuing to move the assistant marker to new gaze points based on the user's eye motion until the user's eye motion settles at the end gaze point and the assistant marker has been moved to a location on the screen that identifies an object of interest to the user. As shown at block 810, a release of the finger gesture is sensed. When the finger gesture is released, the method continues with activating a device function associated with the end gaze point of the user's eye, as shown at block 812. In some examples, activating a device function associated with the end gaze point comprises sensing a tap gesture in the touchscreen initiation area. In other examples, the device function associated with the end gaze point of the user's eye can be activate upon, sensing the release of the finger gesture.

Referring now to the flow diagram of FIG. 9, an example method 900 is shown that is related to providing multi-gesture inputs on a touchscreen device where the gestures include both finger gestures and visual gestures. As shown at block 902, the method includes sensing a finger contact and a finger motion direction within an initiation area of a touchscreen. Upon sensing the finger contact, an eye-tracking function is initiated to determine an eye motion direction of a user's eye, as shown at block 904. As shown at block 906, an object displayed on the touchscreen is manipulated based on a combination of the finger motion direction and the eye motion direction. As shown at block 908, the method 900 also includes capturing images or image information of the user's eye with a camera of the touchscreen device and using the image information to determine the eye motion direction from the images (block 910). In some examples, as shown at block 912, the finger motion direction and the eye motion direction are toward one another and manipulating the object comprises shrinking the object. In other examples, as shown at block 914, the finger motion direction and the eye motion direction are away from one another and manipulating the object comprises enlarging the object. In other examples, as shown at block 915, the finger motion direction and the eye motion direction are circular motions that move together in a clockwise or counterclockwise direction, and manipulating the object comprises rotating the object in a clockwise or counterclockwise direction, respectively.

What is claimed is:

1. A method of providing multi-gesture input on a touchscreen device comprising:
    sensing a finger gesture at a touchscreen initiation area;
    in response to sensing the finger gesture:
        capturing imaging information of a user's eye;
        initiating an eye-tracking function to determine from the imaging information, eye motion and an end gaze point of the user's eye, wherein initiating the eye-tracking function comprises placing an eye assistant marker on a touchscreen to establish a beginning gaze point and moving the assistant marker on the touchscreen to follow a user's eye motion;
    determining from the imaging information that the assistant marker is moving at a different speed than the user's eye based on detecting an eye movement that is not continuous in one direction and moves back to and forth from the assistant marker;
    adjusting a speed of the assistant marker to match a speed of the user's eye in response to the determination;
    sensing a release of the finger gesture; and
    activating a device function associated with the end gaze point of the user's eye.

2. A method as in claim 1, wherein the assistant marker follows the user's eye motion to the end gaze point.

3. A method as in claim 1, wherein activating a device function associated with the end gaze point comprises sensing a tap gesture in the touchscreen initiation area.

4. A method as in claim 1, wherein the finger gesture comprises a press-and-hold finger gesture.

5. A method as in claim 1, wherein the touchscreen initiation area comprises a limited, predesignated portion of the touchscreen, selected from a group consisting of a lower left-hand area of the touchscreen and a lower right-hand area of the touchscreen.

6. A touchscreen device comprising:
    a touchscreen to display objects and sense finger gestures;
    a camera to capture images of a user's eye;
    an eye-tracking module to determine eye gestures based on the images;
    an assistant marker displayed on the touchscreen and controlled by the eye-tracking module to move along the touchscreen in a direction that follows a motion of the user's eye, wherein the eye-tracking module is to determine from the images that the assistant marker is moving at a different speed than the user's eye based on detecting an eye movement that is not continuous in one direction and moves back to and forth from the assistant marker and is to adjust a speed of the assistant marker to match a speed of the user's eye in response to the determination; and
    a multi-gesture control module to initiate a function of the touchscreen device based on a combination of the finger gestures and eye gestures.

7. A touchscreen device as in claim 6, further comprising a function initiation area on the touchscreen to receive finger gestures.

8. A touchscreen device as in claim 7, wherein the function initiation area includes multiple regions wherein each region is associated with and enables initiation of a particular function of the touchscreen device.

9. A non-transitory machine-readable storage medium storing instructions that when executed by a processor of a touchscreen device, cause the touchscreen device to:
  sense a finger contact within an initiation area of a touchscreen;
  in response to sensing the finger contact within a first sub-area of the initiation area, initiate a first eye-tracking function that comprises placing an eye assistant marker on the touchscreen to establish a beginning gaze point and moving the assistant marker on the touchscreen to follow a user's eye motion, determine that the assistant marker is moving at a different speed than a user's eye based on detecting an eye movement that is not continuous in one direction and moves back to and forth from the assistant marker, and adjust a speed of the assistant marker to match a speed of the user's eye in response to the determination; and
  in response to sensing the finger contact within a second sub-area of the initiation area, initiate a second eye-tracking function to determine an eye motion direction of a user's eye and manipulate an object displayed on the touchscreen based on a combination of a finger motion direction and the eye motion direction.

10. A non-transitory machine-readable storage medium as in claim 9, the instructions further causing the touchscreen device to:
  capture images of the user's eye with a camera of the touchscreen device; and
  determine the eye motion direction from the images.

11. A non-transitory machine-readable storage medium as in claim 9, wherein the finger motion direction and the eye motion direction are toward one another and manipulating the object comprises shrinking the object.

12. A non-transitory machine-readable storage medium as in claim 9, wherein the finger motion direction and the eye motion direction are away from one another and manipulating the object comprises enlarging the object.

13. A non-transitory machine-readable storage medium as in claim 9, wherein the finger motion direction and the eye motion direction are circular motions that move together in a clockwise or counterclockwise direction and manipulating the object comprises rotating the object in a clockwise or counterclockwise direction, respectively.

\* \* \* \* \*